(12) United States Patent
Kwatra

(10) Patent No.: US 8,321,422 B1
(45) Date of Patent: Nov. 27, 2012

(54) FAST COVARIANCE MATRIX GENERATION

(75) Inventor: Vivek Kwatra, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 413 days.

(21) Appl. No.: 12/429,102

(22) Filed: Apr. 23, 2009

(51) Int. Cl.
*G06F 7/00* (2006.01)
*G06F 17/30* (2006.01)
(52) U.S. Cl. ........................................ 707/743; 382/103
(58) Field of Classification Search .................. 707/104, 707/3; 382/190, 159, 228, 124, 132, 103
See application file for complete search history.

(56) References Cited

U.S. PATENT DOCUMENTS

| | | | | |
|---|---|---|---|---|
| 6,249,616 | B1 * | 6/2001 | Hashimoto | 382/284 |
| 6,675,174 | B1 * | 1/2004 | Bolle et al. | 1/1 |
| 6,826,300 | B2 * | 11/2004 | Liu et al. | 382/159 |
| 7,120,626 | B2 * | 10/2006 | Li et al. | 1/1 |
| 7,724,960 | B1 * | 5/2010 | Mikhael et al. | 382/190 |
| 7,734,097 | B1 * | 6/2010 | Porikli et al. | 382/190 |
| 2005/0149494 | A1 * | 7/2005 | Lindh et al. | 707/3 |
| 2007/0183629 | A1 * | 8/2007 | Porikli et al. | 382/103 |
| 2008/0235216 | A1 * | 9/2008 | Ruttenberg | 707/5 |

OTHER PUBLICATIONS

"Iteratively reweighted least squares," Wikipedia, Last Modified Jun. 23, 2009, 2 pages, [online] [Retrieved on Jul. 14, 2009] Retrieved from the internet <URL:http://en.wikipedia.org/wiki/Iteratively_reweighted_least_squares>.
Boiman, O., et al., In defense of nearest-neighbor based image classification, IEEE Conference on Computer Vision and Pattern Recognition, Jun. 23-28, 2008, pp. 1-8.
Dai, S., et al., "Soft edge smoothness prior for alpha channel super resolution," IEEE Conference on Computer Vision and Pattern Recognition, 2007, 8 pages.
Efros, A., et al., "Image quilting for texture synthesis and transfer," Computer Graphics Annual Conference (SIGGRAPH 2001); Los Angeles, CA; United States; Aug. 17-21, 2001. pp. 341-346.
Efros, A., et al., "Texture Synthesis by Non-parametric Sampling," 7$^{th}$ IEEE International Conference on Computer Vision, Sep. 20-27, 1999, 10 pages.
Elad, M., et al., "Restoration of single super-resolution image from several blurred, noisy and down-sampled measured images," IEEE Transactions on Image Processing, Dec. 1997, pp. 1646-1658, vol. 6, No. 12.
Elkan, C., Using the triangle inequality to accelerate k-means, Proceedings of the Twentieth International Conference on Machine Learning (ICML-2003), Washington DC, 2003, 7 pages.
Farsiu, S., et al., "Fast and robust multiframe super resolution," IEEE Transactions on Imaging Processing, Oct. 2004, pp. 1327-1344, vol. 13, Is. 10.
Finlayson, G.D., et al., Removing shadows from images, ECCV 2002: European Conference on Computer Vision, 2002, 14 pages.
Freeman, W.T., et al., "Example-based super resolution," IEEE Computer Graphics and Applications, 2002, 14 pages.
Grauman, K., et al., "Approximate correspondence in high dimensions," In NIPS, 2006, 8 pages.

(Continued)

*Primary Examiner* — Marc Somers
*Assistant Examiner* — Thong Vu
(74) *Attorney, Agent, or Firm* — Fenwick & West LLP

(57) ABSTRACT

A covariance matrix associated for a set of spatial and/or temporal sub-portions of a media object is populated based on a lookup table of relative displacements and sums of covariance values generated from pairs of data elements in the media object. The lookup table is generated in linear time, providing an efficient method of generating the covariance matrix.

50 Claims, 8 Drawing Sheets

OTHER PUBLICATIONS

Han, J., et al., "Fast example-based surface texture synthesis via discrete optimization," The Visual Computer, 2006, pp. 918-925, vol. 22.
Hays, J., et al., "Scene completion using millions of photographs," ACM Transactions on Graphics GRAPH, 2007, vol. 26, No. 3.
Irani, M., et al., "Motion analysis for image enhancement: Resolution, occlusion and transparency," Journal of Visual Communication and Image Representation, 1993, 24 pages.
Korah, T., et al., "Analysis of building textures for reconstructing partially occluded facades," European Conference on Computer Vision, 2008, 14 pages.
Kumar, N., et al., "What is a good nearest neighbors algorithm for finding similar patches in images," ECCV, 2008.
Kwatra, V., et al., "Graphcut textures: Images and video synthesis using graph cuts," ACM Transactions on Graphics, Jul. 2003, pp. 277-286, vol. 22, No. 3.
Kwatra, V., et al, "Texture optimization for example-based synthesis," ACM Transactions on Graphics, SIGGRAPH, 2005, pp. 795-802, vol. 24, No. 3.
Lefebvre, S., et al., "Parallel controllable texture synthesis," ACM SIGGRAPH, 2005, pp. 777-786.
Liu, F., "Texture-consistent shadow removal," ECCV. 2008.
Mohan, A., et al., "Editing soft shadows in a digital photograph," IEEE Computer Graphics and Applications, 2007, pp. 23-31, vol. 27, No. 2.
Muller, P., et al., "Image-based procedural modeling of facades," ACM Transactions on Graphics, Jul. 2007, pp. 85-1 to 85-10, vol. 26, No. 3.
Park, M., et al., "Deformed Lattice Detection via Mean-Shift Belief Propagation," European Conference on Computer Vision (ECCV), Oct. 2008, pp. 474-485.
Pauly, M., et al., "Discovering structural regularity in 3rd geometry," ACM Transactions on Graphics, 2008, 11 Pages.
Salvador, E., et al., "Cast shadow segmentation using invariant color features, Computer vision and image understanding," Computer Vision and Image Understanding, 2004, pp. 238-259, vol. 95.
Schindler, G., et al. "Detecting and matching repeated patterns for automatic geo-tagging in urban environments," Computer Vision and Pattern Recognition, CVPR, 2008, pp. 1-7.
Shotton, J., et al., "Semantic texton forest for image categorization and segmentation," Computer Vision and Pattern Recognition, CVPR, 2008, pp. 1-8.
Sun, J., et al., "Image hallucination with primal sketch priors," Computer Vision and Pattern Recognition, 2003, 8 pages.
Torralba, A., et al., "Context-based vision system for place and object recognition," Proceedings. Ninth IEEE International Conference, Oct. 13-16, 2003, pp. 273-380, vol. 1.
Vazquez, E., et al., "Image segmentation in the presence of shadows and highlights," Computer Vision—ECCV, 2008, 14 pages.
Wang, Q., et al., "Patch based blind image super resolution," ICCV 2005. Tenth IEEE International Conference, Oct. 17-21, 2005, pp. 709-716, vol. 1.
Wang, H., et al., "Factoring repeated content within and among images," International Conference on Computer Graphics and Interactive Techniques, ACM SIGGRAPGH 2008, 10 pages.
Wu, T., et al., "Natural shadow matting," ACM Transactions on Graphics, Jun. 2009, Pages, vol. 26, Issue 2, Article 8.
Zhao, T., et al., "Segmentation and tracking of multiple humans in complex situations," CVPR, 2001, 8 pages.
Cao, G., et al., "Covariance estimation for high dimensional data vectors using the sparse matrix transform," In Daphne Koller, Dale Schuurmans, Yoshua Bengio, and Lon Bottou, editors, NIPS, pp. 225-232. MIT Press, 2008.
Higham, N.J., "Computing the nearest correlation matrix a problem from finance," IMA Journal of Numerical Analysis, 22(3):329-343, 2002.
Jain, A. K., et al., "Statistical pattern recognition: A review," IEEE Transactions on Pattern Analysis and Machine Intelligence, 22(1):4-37, 2000.
Porikli, W. F., et al., "Fast construction of covariance matrices for arbitrary size image windows," In Proc. Intl. Conf. on Image Processing, pp. 1581-1584, 2006.
Qi, J., et al., "Fast computation of the covariance of map reconstructions of pet images," vol. 3661, pp. 344-355, 1999.
Stein, C., et al., "Improving the usual estimator of a normal covariance matrix," Dept. of Statistics, Stanford University, Report 37, 1972.

* cited by examiner

| Relative Displacement | X Displacement | Y Displacement | Sum of Covariance Values |
|---|---|---|---|
| 220 ⟿ [-10, 10 diagram] | 10 | -10 | $\sum_v \sum_w x1_{i+v,\,j+w} * x1_{i+10+v,\,j-10+w}$ ⟿ 222 |
| 230 ⟿ [-15, 12 diagram] | 12 | -15 | $\sum_v \sum_w x1_{i+v,\,j+w} * x1_{i+12+v,\,j-15+w}$ ⟿ 232 |
| 240 ⟿ [-8, 0 diagram] | 0 | -8 | $\sum_v \sum_w x1_{i+v,\,j+w} * x1_{i+0+v,\,j-8+w}$ ⟿ 243 |

FAST COVARIANCE MATRIX GENERATION

TECHNICAL FIELD

The disclosed embodiments relate to the areas of search and classification, and more particularly to fast covariance matrix generation for searching and classifying data.

BACKGROUND OF THE INVENTION

Search and classification algorithms are routinely used in many areas of computer science to identify media objects such as audio data, video data, image data, and geographic data objects based on features that describe attributes or elements of the media objects. Search algorithms seek to selectively identify one or more media objects that best correspond to or match a given set of features. For example, based on an input set of features, one or more instances of the same media object may be identified (e.g. multiple occurrences of a same image or video). In some applications such as image identification, the selected features are invariant of aspects of the media object that may be subject to changes, for example, resolution in image data or noise in audio data. Classification algorithms generate "classifiers" or statistical models which define a set of features which are associated with a class or category of media objects. The classifiers are then used to determine the likelihood that a media object belongs to a class or category of media objects based on its features.

One approach to searching and classifying these media objects is to partition the data elements of a media object into a plurality of sub-portions. A set of features is then generated for each sub-portion of the media object. The sub-portions can be spatial, temporal or both. For example, in a pixel-based image object, such as a 640×480 image, the data elements of image file are pixels, which may be partitioned into a plurality of sub-portions, such 32×32 pixel windows; from each sub portion, the features of interest are generated. In a video file, the sub-portions may be both spatial (e.g., 32×32 pixels) and temporal (e.g., 1 frame or some number of milliseconds) in extent. In audio objects, the sub-portions may be temporal, comprising a selected number of frames, samples, or windows of fixed duration (e.g., 50 milliseconds). The ability to partition the media file into sub-portions is based on the fact that the data represent real world entities: images/pictures, videos, audio recordings, which inherently have spatial and/or temporal characteristics.

This approach typically produces a very large number of features for the media objects to be classified, especially when the set of such objects is very large, such as millions of images. This is especially so when a separate feature is generated for each data element in each sub-portion of the media object (e.g. a feature is generated to represent every pixel in patch of an image) and/or there are many overlapping sub-portions generated for the media object (e.g., overlapping patches in an image, overlapping time windows in a video or audio file). Matrix decomposition techniques such as Principal Component Analysis are commonly used in search and classification algorithms to reduce the number of features in a set of features based on variances and correlations within the feature data.

In order to perform matrix decomposition techniques, a covariance matrix is first generated. The covariance matrix describes the covariance between the different features associated with the sub-portions of the media object. In instances where the features are based upon data elements in the media object, each entry in the covariance matrix is generated by taking the outer product between a pair of data elements X and Y, i.e. the sum of the products of the values associated with the data elements over all of the sub-portions of the media object. Therefore, if the number or "dimensionality" of the features/data elements is d, generating a covariance matrix has an order of operation of $O(nd^2)$, where n is proportional to the size of the media object. As those of skill in the art recognize, the order O of an operation represents the relative consumption of computing resources, such as memory and processor time, necessary to complete the operation. In most circumstances, the computing time required for performing an algorithm of order $O(nd^2)$ precludes the efficient generation of the covariance matrix. Therefore, the use of matrix decomposition techniques which can be used to reduce the dimensionality of the feature set is also precluded.

SUMMARY OF INVENTION

The present invention provides systems, methods, and computer program products for fast generation of a covariance matrix for a media object, wherein each entry in the covariance matrix is based upon data elements derived from a set of spatial and/or temporal sub-portions of the media object. These embodiments of the present invention provide an order of operation of $O(nd)$ and/or $O(n\log n)$, and thereby result in dramatically decreased computation time and memory consumption as compared with conventional methods for generating a covariance matrix.

A media object comprises data elements with spatial and/or temporal characteristics, in that the data elements have a spatial and/or temporal extent. As a result, between any pair of data elements, there is a relative displacement which specifies the location or offset of the pair of data elements relative to each other. For example, for any pair of pixels in an image there will be a displacement that describes the spatial and/or temporal offset between them; similarly, for any two samples in an audio file, there will a temporal distance (e.g., time difference) between them. In one embodiment then, a relative displacement value is identified for each pair of data elements within in a sub-portion of the media object. For each relative displacement value, covariance values are generated for all pairs of data elements in the media object that have that relative displacement, and then summed. This operation produces a sum of the covariance values for each relative displacement value. These relative displacement sums are stored in a lookup table in memory. The lookup table is then used to very quickly and efficiently populate the covariance matrix by looking up, by determining for any pair of data element their relative displacement value, and then looking up the associated sum for that value, and entering that into the covariance matrix with respect to the pair of data elements. The covariance matrix is likewise stored in memory.

Once the covariance matrix is populated, matrix decomposition techniques such as principal component analysis are applied to the covariance matrix to identify lower-order principle components which describe the variance in the data elements associated with the sub-portions of the media object. Based on the lower-order components, a set of features is generated for the sub-portions of the media object. Sets of features for the sub-portions of the media objects are used to search and classify media objects.

The features and advantages described in this summary and the following detailed description are not all-inclusive. Many additional features and advantages will be apparent to one of ordinary skill in the art in view of the drawings, specification, and claims hereof.

The figures depict various embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE DRAWINGS

Figure 1:
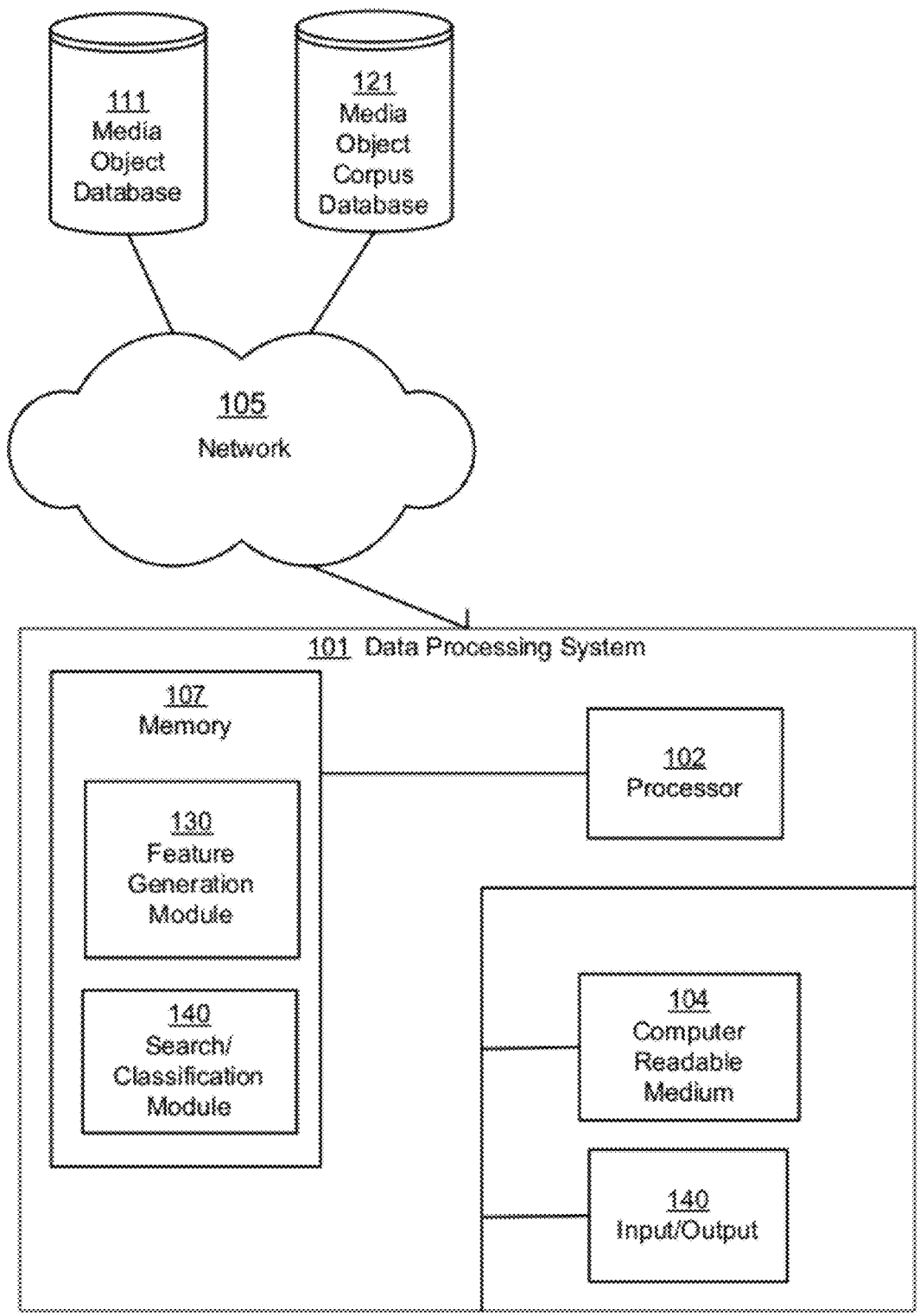
FIG. 1 shows a system architecture for a classification system.

FIG. 1 shows a system architecture 100 adapted to support one embodiment. FIG. 1 shows components used to generate features associated with a media object and search or classify input media objects based on the features. The system architecture 100 includes a network 105, through which Media Object Databases 111 that store input media objects for search and classification and Media Object Corpus Databases 121 that store reference media objects for search and classification are accessed by a data processing system 101. Reference media objects, as used herein, refers to any collection of media object about which information is known such as the classes or the media objects, rights holders for the media objects or annotations information associated with the media objects.

FIG. 1 shows component modules used to search and classify to media objects. The data processing system 101 includes a Feature Generation Engine 130 and a Search/Classification Module 140. In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment of the present invention, and other embodiments may include other modules. In addition, embodiments may lack modules described herein and/or distribute the described functionality among the modules in a different manner. Additionally, the functionalities attributed to more than one module can be incorporated into a single module. In an embodiment where the modules are as implemented by software, they are stored on a computer readable storage medium 104 (e.g., hard disk), loaded into the memory 107 (also a computer readable storage medium), and executed by one or more processors 102 included as part of the system 101. Alternatively, hardware or software modules may be stored elsewhere within the system 101.

The Feature Generation Engine 130 operates to identify media objects, partition the media objects into sub-portions and generate sets of features for the sub-portions of the media objects. The Feature Generation Engine 130 further operates to generate covariance matrices for the reference media objects stored in the Media Object Corpus Databases 121 based on the sub-portions of the reference media objects. The generated covariance matrices are stored in memory 107 as well. The Feature Generation Engine 130 applies dimension reduction algorithms such as Principal Component Analysis to the generated covariance matrices associated with the reference media objects in order to indentify principal components common to the set of reference media objects. The Feature Generation Engine 130 uses the principal components to generate sets of features with reduced dimensionality for the sub-portions of the reference media objects. The Feature Generation Engine 130 further uses the principal components to generate sets of features with reduced dimensionality for the sub-portions of input media objects.

The Search/Classification Engine 140 applies search and classification algorithms to input and reference media objects based on the sets of features generated by the Feature Generation Engine 130. The Search/Classification Engine 140 generates search indices such as search trees based on sets of features associated with reference media objects in the Media Object Corpus Databases 121, stores these indices in memory 107, and uses the search trees/indices to identify matches between reference media objects in Media Object Corpus Databases 141 and input media objects in the Media Object Databases 111. The Search/Classification Engine 140 generates classifiers based on sets of features associated with reference media objects labeled with classes in the Media Object Corpus Databases 121, stores the classifiers in memory 107, and uses the classifiers to determine whether input media objects in the Media Object Databases 111 correspond to classes of media objects. The Feature Generation Engine 130 and the Search/Classification Engine 140 can operate on the sets of media objects in different orders than described above.

It should also be appreciated that in practice at least some of the components of the data processing system 101 will be distributed over multiple computers, communicating over a network. For example, either or both the Feature Generation Engine 130 and the Search/Classification Engine 140 may be deployed over multiple computer servers. For convenience of explanation, however, the components of the data processing system 101 are discussed as though they were implemented on a single computer.

In another embodiment, some or all of the Media Object Corpus Databases 121 and the Media Object Databases 111 are located on the data processing system 101 instead of being coupled to the data processing system 101 by a network 105. For example, the Search/Classification Engine 140 may classify or search sets of input media objects from Media Object Databases 111 that are a part of or associated with the data processing system 101.

FIG. 1 shows that the data processing system 101 includes a memory 107 and one or more processors 102. The memory 107 includes the Feature Generation Engine 130 and the Search/Classification Engine 140 each of which is preferably implemented as instructions stored in memory 107 and executable by the processor 102.

FIG. 1 also includes a computer readable storage medium 104, which can also be used for storing, for example, at least one of the Feature Generation Engine 130 and the Search/Classification Module 140, as well as the covariance matrices, intermediate products (e.g., lookup tables and principal components), and classifiers variously generated by these modules. System 101 also includes one or more input/output devices 140 that allow data to be input and output to and from the data processing system 101. It will be understood that embodiments of the data processing system 101 also include standard software and hardware components such as operating systems and the like and further include standard hardware components (e.g., network interfaces, storage devices, etc.) not shown in the figure for clarity of example.

Figure 2A:
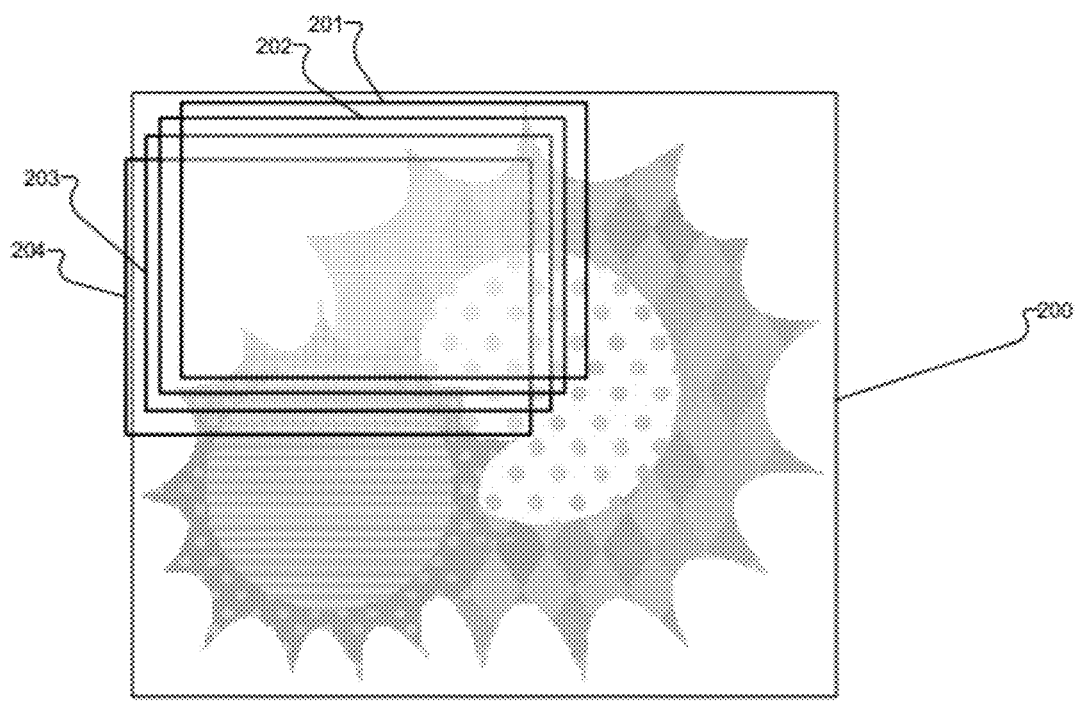
FIGS. 2a-2f illustrate fast covariance matrix generation according to embodiments of the present invention.

FIGS. 2a-2d provide a conceptual illustration of feature and covariance matrix generation according to an embodiment of the present invention. For the purposes of description, the media objects described here are images 200, comprised of a rectangular array of pixels, each of which stores one or more channels of color values. For example, an image 200 can be a 640×480 array of pixels, though obviously other size images could be used as well. Each image thus has a spatial extent. In the present invention, a "sliding window" approach is used to select sub-portions of the media object. Using the sliding window technique, a set of overlapping sub-portions of the media object is generated, where an $i^{th}$ sub-portion differs from an $i+1^{th}$ sub-portion in the set by being displaced a fixed offset. The fixed offset can correspond to one data element (e.g. one pixel, one time point, one 3-dimensional coordinate), or a fixed number of data elements (e.g., 10 pixels, 10 milliseconds, etc.). FIG. 2a illustrates an instance where the media object is a digital image 200 and the set of sub-portions of the image data 201, 202, 203, 204 are "patches" (i.e. images that contain a sub-portion of the pixels in the digital image and have a same area). In other instances, the media object and corresponding sub-portions may comprise different types of data such as audio data, video data or geographic data.

Figure 2B:
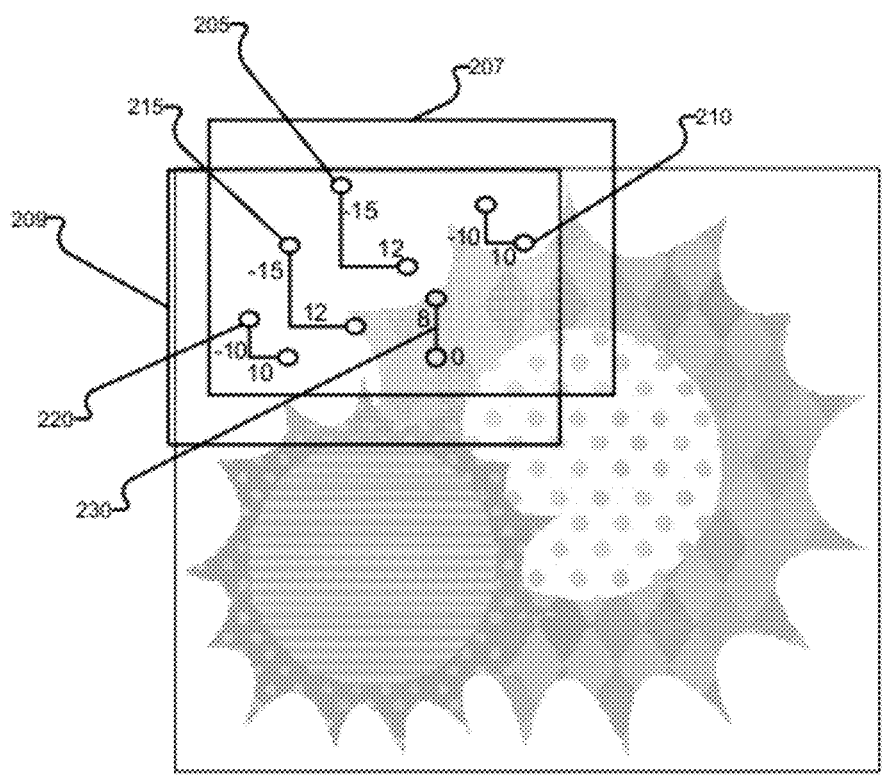

FIG. 2b illustrates a set of pairs of data elements 205, 210, 215, 220, 240 in a sub-portion of the media object 200. Each data element is identified by the coordinates it is located at within the image (or alternatively within the sub-portion). Each pair of data elements is based on two data elements in the sub-portion of the data. The data value of a data element in this example is the pixel value or derivatives thereof (e.g., RGB, HSV, HSL values or filter responses). In other instances, the values associated with the pairs of data elements correspond to the type of media object (e.g. pitch associated with a time points in an audio media object or altitude values associated with coordinates in geographic information data object). The data values for the pairs of data elements are used to calculate a "covariance value" which represents a product of values associated with the data elements, etc. While the majority of the discussion herein is directed to covariance matrices and covariance values, it is noted that the described method may be applied to calculating other functions of the data values associated with the pairs of data elements (e.g. average of the data values, the difference between the data values) to generate different types of matrices. Each pair of data elements has a "relative displacement" that describes the offset between the elements, upon their location within the sub-portion. As image data is expressed in two-dimensions, the relative displacement may be expressed using x and y coordinates. In other instances, the relative displacement may be expressed as an interval for one-dimensional media objects (e.g. a number of seconds in an audio file) or as a vector for two or three-dimensional media objects.

In FIG. 2b, an instance of a set of pairs of data elements 205, 210, 215, 220, 230 is illustrated. The relative displacements of the pairs of data elements are illustrated using line connecting the pairs of data elements (pixels). For each sub-portion of data, there may be many several pairs of data elements that correspond to the same relative displacement. In the example illustrated, the pair of data elements 205 and 215 have the same relative displacement (12, −15), as do the pair of data elements 210 and 220 (10, −10). The number of pairs of data elements with a same relative displacement is typically a function of the size of the sub-portion of the media object. Similarly, if a pair of data elements in an audio file have a relative displacement of 0.5 seconds, a clip that is 10 seconds in length will have 50 pairs of data elements with the same relative displacement (0.5 seconds).

Due to the overlap between sub-portions of the media object, a pair of data elements occurring in one sub-portion may also occur in multiple other different sub-portions of the media object at different locations in the sub-portions of the media-object with respect to the origin of the media object. For instance, in FIG. 2b, a first patch 209 includes (among many others) pairs of data elements 205 at a fixed location with respect to the origin of patch 209. This pair of data elements 205 also occurs within patch 207 (which is offset from patch 209 by a known amount) at a different location with respect for the origin of patch 207. Accordingly the covariance value representing the product of the pair of data elements 205 may be re-used when calculating the covariance values for the patches 207 and 209.

Thus, in the present invention, the use of overlapping sub-portions of the media object allows for the re-use of covariance value calculations. This is because, due to the overlap between sub-portions caused by the sliding window method, a potential sub-portion may be selected such that there is a pair of data elements that correspond to same location relative to the origin of the sub-portion. As shown, the sliding window enables the system to take advantage of the result that the sum of all covariance values for a given pair of data elements at a specific location (with respect to the origin of the sub-portion of the media object) within in a sub-portion of data is the same for all pairs of data elements across all sub-portions having the same relative displacement as the given pair. In one embodiment, selecting the potential sub-portion of the media object comprises sampling of sub-portions of data that extend beyond the boundary of the media object. For example, in FIG. 2b patch 207 extends beyond the boundaries of the image. Therefore, generating a sum of covariance values corresponding to a same feature based on all data elements with the same relative displacement as the feature comprises including covariance values associated with sub-portions of the media object that extend beyond the boundaries of the media object. By assuming that the error in accuracy associated with the sub-portions of the media object that do not exist is small, this method allows for the calculation of all the covariance values in a time that is proportion to the size of the media object n and the number of data elements d. Thus, the result is that the order of operation for these elements is $O(nd)$, rather than $O(nd^2)$.

Accordingly, the present invention takes advantage of the multiple occurrences of a given pair of data elements by computing their covariance value only a single time (regardless of the number of patches the pair occurs in), rather than once for each patch that the pair occurs in. Since these two pairs have the same relative offset (12, −15), their covariance values can be added together, along with the covariance values of all other pairs of data elements with the same relative offset of (12, −15). The same holds true for all other offset values over the domain of the same of the window (32×32). Thus, in this example, there are 1,024 relative offset pairs, and thus 1,024 covariance sums. The computational savings from this approach are significant: assume a pair of pixels in the middle of an arbitrary image, and use patches of 32×32 pixels, where the patches are slid across the image one pixel at a time. The pair of pixels then occur in 1,024 ($32^2$) windows. Instead of re-computing the covariance value for this pair 1,024 times, the covariance value is computed only a single time.

Figures 2C, 2D:
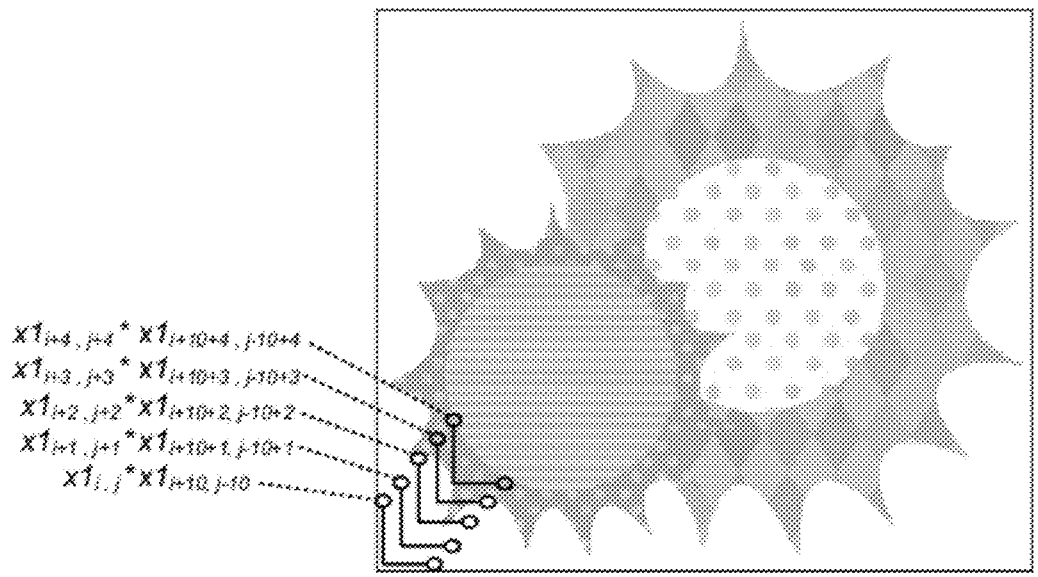

FIG. 2c illustrates an implementation of this approach. A set of all possible pairs of data elements corresponding a relative displacement are identified. Covariance values (represented as $x1_{i+v,\ j+v} * x1_{i-10+v,\ j+10+w}$, where 1 and j are the origin coordinates of the media object and v and w take the value of integer numbers 1, 2, 3 and 4) are calculated for each pair of data elements corresponding to the relative displacement. The covariance values are summed for this relative displacement value, and stored in association with the relative displacement in a lookup table.

FIG. 2d illustrates an example lookup table for the features shown in FIG. 2b. In FIG. 2b, the features 205, 210, 215, 220, 240 correspond to the three unique relative displacements 220, 230 and 240 tabulated in FIG. 2d. Indicia representing each relative displacement (x and y coordinates) is tabulated in association with the sum of covariance values for all pairs of data elements with the relative displacement over all v and w values corresponding to data elements in the media object. Using this lookup table, a covariance matrix for the media object may be populated by determining the relative displacement for a pair of data elements corresponding to an entry in the covariance matrix and copying the value associated with the relative displacement in the lookup table into the entry in the covariance matrix.

Figures 2E, 2F:
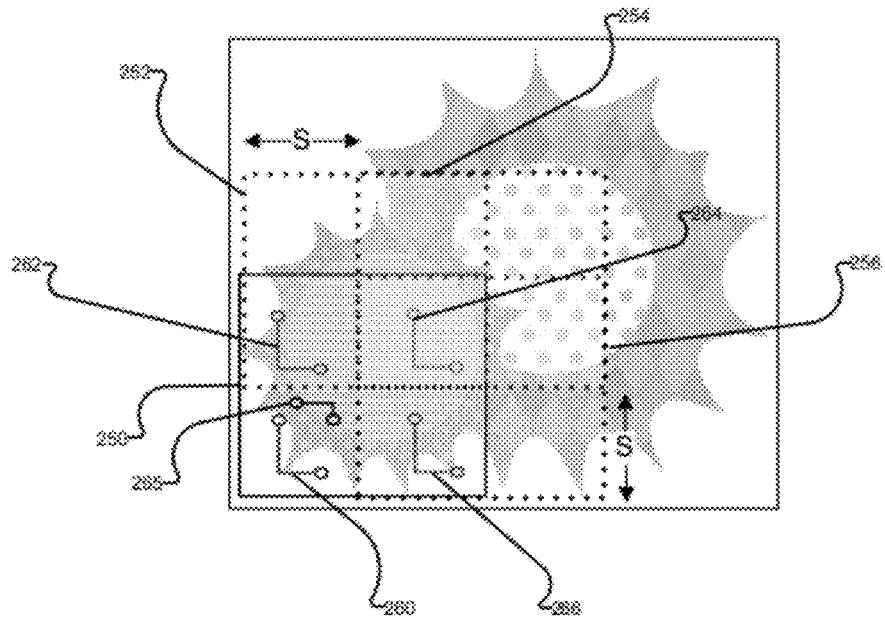

FIG. 2e illustrates an embodiment of the present invention in which the offset between sub-portions of the media object is larger than one data element. In the illustrated example, the patches 250, 252, 254, 256 generated for the digital image have an offset equal to "s", where s is equal to 60 pixels (i.e. greater than one data element). Each of the patches 250, 252, 254 and 256 comprises a pair of data elements 260, 262, 264, 266 with the same relative displacement (10, −10) and the same position with respect to the origin of the patches 250, 252, 254 and 256. Different patches comprise different combinations of the pairs of data elements; patch 250 comprises all four pairs of data elements, patches 252 and 256 comprise two pairs of data elements and patch 254 comprises one pair of data elements.

Due to the offset being greater than one data element, it is not possible to select a potential sub-portion for every pair of data elements such that the pair of data elements occupies the same location relative to the origin of the sub-portion. For example, due to the limited overlap between windows, a potential window cannot be drawn such that the pair of data elements 265, is included in multiple windows. Accordingly, all pairs of data elements in the media object with the same relative displacement cannot be summed to compute a single sum of covariance values for a single relative displacement value. However, the covariance values for the pairs of data elements may still be re-used by summing the pairs of data elements 260, 262, 264, 266 with a same relative displacement that occur at the same location relative to the origin of the sub-portion. Therefore, the covariance values for the pairs of data elements 260, 262, 264, 266 in sub-portion 250 may only be computed once and re-used for sub-portions 252, 254, 256. For example, the covariance value computed for the pair of data elements 264 may be computed for patch 250 and re-used for patch 254. This same principle can be applied to any two pairs of data elements that are offset by s.

There is additional computational burden associated with determining the pairs of data elements associated with both a same relative displacement and a same location relative to the origin of the sub-portion instead of summing the covariance values associated with all pairs of data elements with the same relative displacement. However, this additional computational burden is compensated for by performing less computations of covariance values as each sum of covariance values corresponding to a same location relative to the origin of a sub-portion contains only n/(s*s) values. Extending this to all pairs of data elements, we can conclude that we will only need to compute (s*s) sums of covariance values in total. Accordingly, the total number of covariance values generated for the (s*s) sums and d relative displacements is [(s*s)*n]/[(s*s)*d]= nd and the complexity of populating the lookup table in this embodiments remains O(nd).

In FIG. 2f, the entries in the lookup table correspond to the same relative displacements at different locations with respect to coordinates specifying the location of the pair of data elements relative to the origin of the sub-portions of the data. Indicia representing the relative displacement (x and y coordinates) of the pair of data elements and indicia representing the location of the pair of data elements with respect to the origin (x and y coordinates represented as v and w) of the sub-portion of the media object (i.e. patch) is tabulated in association with the sum of covariance values for all pairs of data elements with the relative displacement over all values vs and ws which correspond to data elements at the same location in the sub-portions of data. In this embodiment, the vs and ws values are calculated by iteratively adding or subtracting the offset value to the set of coordinates specifying the location of the pair of data elements with respect to the origin of the path (v and w). For instance, all possible values of vs would be calculated by iteratively adding the value of the offset "s" (i.e. $vs_1=v+s$, $vs_2=vs_1+s\ldots$).

Using this lookup table, a covariance matrix for the media object may be populated by determining the relative displacement for a pair of data elements corresponding to an entry in the covariance matrix and a location of the pair of data elements relative to the origin of the sub-portion of the media object. The value associated with the relative displacement and location in the lookup table is then copied into the entry in the covariance matrix.

Figure 3:
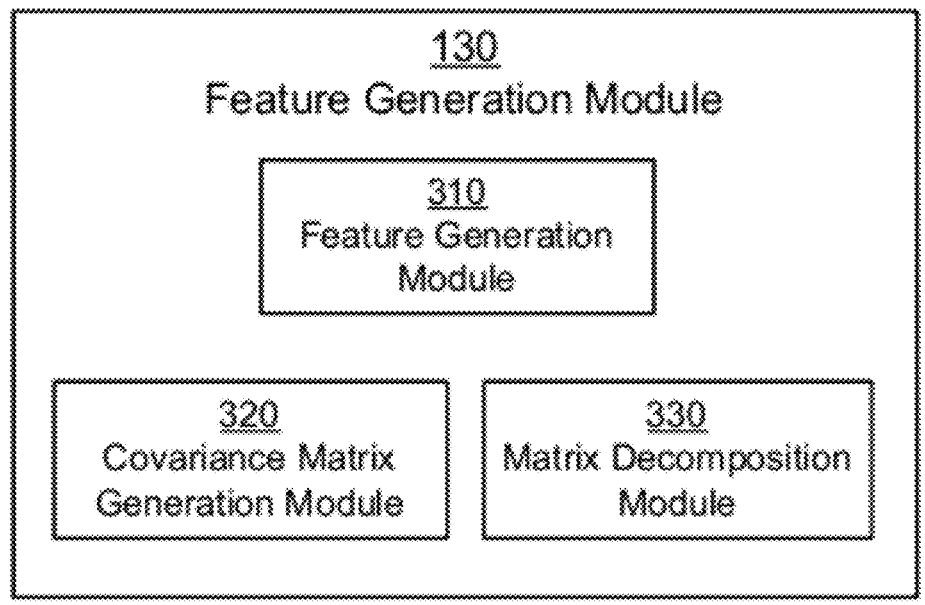
FIG. 3 illustrates one embodiment of a Feature Generation Engine 130.

FIG. 3 illustrates one embodiment of a Feature Generation Engine 130. The Feature Generation Engine 130 is comprised of three modules, a Feature Generation Module 310, a Covariance Matrix Module 320, and a Matrix Decomposition Module 330. Those of skill in the art will recognize that other embodiments of the Feature Generation Engine 130 can have different and/or other modules than the ones described here, and that the functionalities can be distributed among the modules in a different manner.

The Feature Generation Module 310 functions to generate a set of features associated with a media object. The Feature Generation Module 310 communicates with the Media Object Database 111 and the Media Object Corpus Database 121 through the network 105 to receive input media objects and reference media objects. The Feature Generation Module 310 communicates with the Covariance Matrix Module 320 and the Matrix Decomposition Module 330 to generate principal components based on the reference media objects.

The Feature Generation Module 310 further generates a set of sub-portions for each media object by selecting sub-portions of the media object at fixed intervals. In one embodiment, the Feature Generation Module 310 uses a sliding window technique to generate the set of sub-portions of the media object. The sliding window technique is a technique in which an interval, area or volume, is advanced one data element at a time to generate a set of sub-portions of data. In alternate embodiments, the interval, area or volume, is advanced by more than one data element at a time (e.g. 10 pixels at a time).

In some embodiments, the Feature Generation Module 310 pre-processes the values associated with the data elements. In one embodiment, the media objects may be pre-processed using filter or wavelet-based algorithms.

The Feature Generation Module 310 generates sets of features for both the reference media objects and input media objects based on principal components generated by the Matrix Decomposition Module 330. The Feature Generation Module 310 generates feature vectors which represent the values of the data elements in the sub-portion of the media object. The Feature Generation Module 310 generates a reduced set of features associated with each sub-portion of a media object by taking the dot product of the lower-order principal components and the feature vectors. The Matrix Decomposition Module 330 stores the reduced sets of features associated with the sub-portions of the input and reference media objects. The Feature Generation Module 310 transmits the set of features generated for the input and reference media objects to the Search/Classification Module 140.

The Covariance Matrix Generation Module 320 generates a covariance matrix associated with the reference media objects. If there are multiple reference media objects, the Covariance Matrix Generation Module 320 can generate one covariance matrix for each media object, and combine these separate covariance matrices into a single covariance matrix, for example, by taking a weighted average of the covariance matrices. In this embodiment, the covariance matrices are weighted based on the number of pairs of elements used to generate entries in the covariance matrices (i.e. the sums of the covariance values), then the weighted covariance matrices are averaged. In one embodiment, all entries in each covariance matrix are weighted by a same weight corresponding to the average number of pairs of data elements used to generate the sums of the covariance values corresponding to the entries. In another embodiment, each entry in the covariance matrix is weighted individually based on the number of covariance values used to generate the sum of the covariance value in the entry. The Covariance Matrix Generation Module 320 receives a reference media object in association with a set of values indicating the sub-portions of the reference media object from the Feature Generation Module 310. The Covariance Matrix Generation Module 320 generates a lookup table of the relative displacements of all pairs of data elements in the sub-portions of the media object, and the sum of the covariance values associated with each set of pairs of data elements having the same relative displacement. In one embodiment, the Covariance Matrix Generation Module 320 identifies, for each relative displacement value, all the pairs of data elements with this relative displacement, and generates the covariance values for the pairs of data elements, and sums these values. The summed values are stored in the lookup table for their corresponding relative displacement value.

In an alternate embodiment, the Covariance Matrix Generation Module 320 generates a second copy of the media object and uses the second copy of the media object to perform a Fast Fourier Transform on the media object to generate all covariance values corresponding to all relative displacement values. The Covariance Matrix Generation Module 320 uses the Fast Fourier Transform to perform a convolution operation. This convolution operation allows the Covariance Matrix Generation Module 320 to generate the sum of products for all pairs of data elements with the same relative displacement in O(nlogn) time. Therefore, using the Fast Fourier Transform, the complexity of the algorithm is reduced from O(nd) to O(nlogn).

Once all covariance values corresponding to a relative displacement value have been generated, the Covariance Matrix Generation Module 320 sums the covariance values and stores the sum of the covariance values in association with indicia which represents the relative displacement (e.g. intervals represent the relative displacement, coordinates which represent the relative displacement, vectors which represent the relative displacement, a hash or index of any of the foregoing) in the lookup table. The Covariance Matrix Generation Module 320 repeats this process for each possible relative displacement value associated with a sub-portion of the data.

The Covariance Matrix Generation Module 320 generates a covariance matrix based on the sub-portions of the media object. Each entry in the covariance matrix corresponds to the outer product, or sum of covariance values corresponding to pair of data elements over the different sub-portions of the media object. To populate an entry in the covariance matrix, the Covariance Matrix Generation Module 320 identifies the relative displacement associated with the data elements corresponding to the entry, identifies the sum of the covariance values associated with relative displacement in the lookup table and copies the sum of the covariance values to the entry in the covariance matrix. The Covariance Matrix Generation Module 320 proceeds to populate all of the entries in the covariance matrix according to this method. Once the covariance matrix has been populated, the Covariance Matrix Generation Module 320 stores the covariance matrix in memory 107. In some embodiments the Covariance Matrix Generation Module 320 transmits the covariance matrix to other modules and/or modules external to the Feature Generation Engine 130 and the covariance matrix is used directly for applications such as clustering, machine learning and generation of Mahalanobis distances. The Covariance Matrix Generation Module 320 transmits the covariance matrix to the Matrix Decomposition Module 330. The Covariance Matrix Generation Module 320 further stores the covariance matrix in memory 107.

The Matrix Decomposition Module 330 generates a set of principal components which represent variance within the set of reference media objects. The Matrix Decomposition Module 370 receives a covariance matrix associated with one or more reference media objects from the Matrix Decomposition Module 370. In one embodiment, the Matrix Decomposition Module 370 generates a decomposition of the covariance matrix into eigenvalues and eigenvectors using Principal Component Analysis (PCA). Principal Component Analysis is used to generate sets of features with reduced dimensionality by identifying lower-order components (eigenvectors) which represent variance in the feature data. The Matrix Decomposition Module 370 identifies a set of lower-order components which characterize the variance over the different sub-portions of data. The Matrix Decomposition Module 370 stores the principal components including the lower-order principal components in memory 107 associated with the Feature Generation Engine 130.

Figure 4:
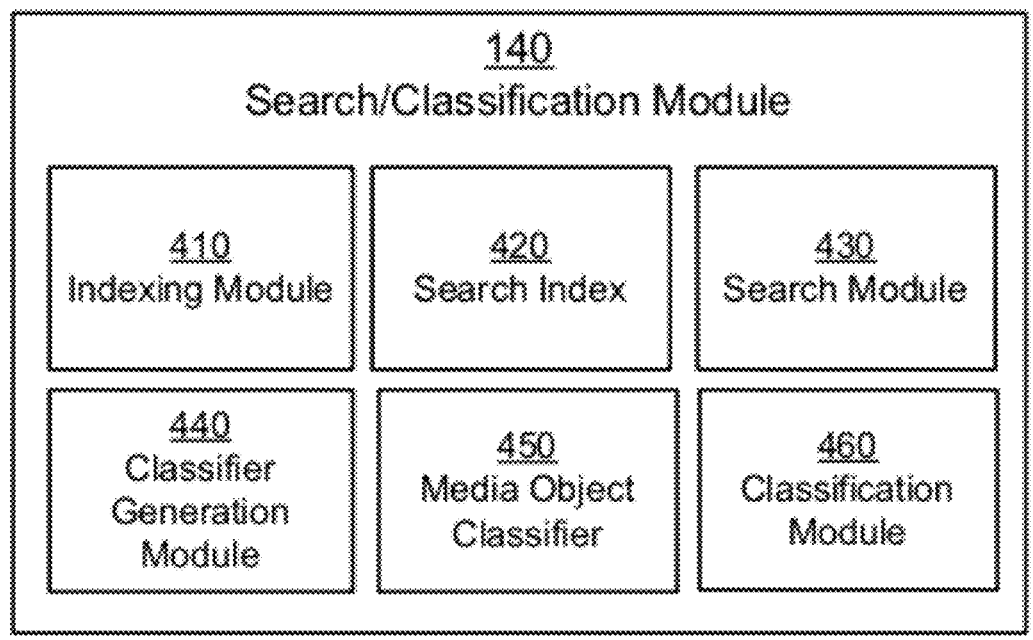
FIG. 4 illustrates one embodiment of a Search/Classification Engine 140.

FIG. 4 illustrates one embodiment of a Search/Classification Module 140. The Search/Classification Engine 140 is comprised of an Indexing Module 410, a Search Index 420, a Search Module 430, a Classifier Generation Module 440, one or more Media Object Classifiers 450 and a Classification Module 460. The Search/Classification Engine 140 is adapted to communicate with the Media Object Database 111 and the Media Object Corpus Database 121. As shown in FIG. 4, the Search/Classification Engine 140 includes several modules. Those of skill in the art will recognize that other embodiments of the Search/Classification Engine 140 can have different and/or other modules than the ones described here, and that the functionalities can be distributed among the modules in a different manner.

The Indexing Module 410 communicates with the Feature Generation Engine 130 to receive features associated with the reference media objects stored in the Media Object Corpus Database 121. The Indexing Module 410 generates a Search Index 420 which associates a unique identifier representing each reference media object with the set of features associated with the reference media object. In one embodiment, the Indexing Module 410 generates a Search Index 420 which associates each reference media object with all of the features associated with all of the sub-portions of the reference media object. In an alternate embodiment, the Indexing Module 410 generates a Search Index which stores the set of features associated with each sub-portion of the media object in association with an offset value that indicates a position of the sub-portion of the media object in the media object.

In another embodiment, the Indexing Module 410 generates a tree data structure based on the features associated with the reference media objects using unsupervised learning methods. The tree data structure organizes the reference media objects according to similarity between the sets of features associated with the media objects in order to efficiently search the tree. In a specific embodiment, the Indexing Module 410 generates a hierarchical K-means tree based on the features associated with the reference media objects. In this embodiment, a hierarchical tree structure comprised of "centroids" is constructed, where each centroid represents a set of features common to a group or sub-group of reference media objects. In other embodiments, other unsupervised learning methods such as agglomerative clustering and expectation maximization may be used to generate a tree data structure. The Indexing Module 410 stores the generated Search Index 420 in memory 107 associated with the Search/Classification Module 140.

The Classifier Generation Module 440 communicates with the Feature Generation Engine 130 to receive features associated with the media objects stored in the Media Object Corpus Database 121 in association with class labels for the media objects. The Classifier Generation Module 440 generates a Media Object Classifier 450 which is used to determine whether a media object belongs to a class. The Classifier Generation Module 440 generates the Media Object Classifier 450 by applying a classification algorithm to the features associated with a set of media objects labeled with a class and features associated with a set of media objects that are not labeled with the class. Suitable classification algorithms include but are not limited to: support vector machines (SVMs), neural networks, logistic regression, bagging, boosting and expectation maximization. In some embodiments, the Classifier Generation Module 440 further validates the Media Object Classifier 450. The Classifier Generation Module 440 stores the Media Object Classifier 450 in memory 107 associated with the Search/Classification Module 140.

The Search Module 430 is used to identify matches between input media objects and indexed media objects. The Search Module 430 may be used to identify matches representing redundant media objects in a database, matches between user-generated media objects and copyrighted media objects and matches between images of different resolution. The Search Module 430 may also be used to identify matches between input and reference media objects to synthesize composite media object. For instance, matches to high resolution images of a window may identified based on an input media object comprising an image of a building with low resolution. The high-resolution image may be combined with the low resolutions image to synthesize a composite image of the building with high-resolution windows.

The Search Module 430 communicates with the Feature Generation Engine 130 to receive a set of features associated with an input media object stored in the Media Object Database 111. The Search Module 430 uses the set of features to search the Search Index 420 in order to determine whether media objects stored in the search index match the input media object. For each entry in the Search Index 420 (e.g. a media object or a sub-portion of a media object), the Search Module 430 determines whether the features associated with the entry match the set of features associated with the input media object (or sub-portion thereof). For instance, the Search Module 430 may determine some sub-portion of an input media object is associated with the same set of features as a sub-portion of a media object in the Search Index 420. If the Search Module 430 determines that the features associated with the entry match the set of features associated with the input media object (or sup-portion thereof), the Search Modules 430 determines a match between the media object represent by the entry in the Search Index 420 and the input media object. The Search Module 430 stores results of the match determination in memory 107 associated with the Search/Classification Module 140.

The Classification Module 460 communicates with the Feature Generation Engine 130 to receive a set of features associated with an input media object stored in the Media Object Database 111. The Classification Module 460 applies one or more Media Object Classifiers 450 to the set of features associated with the input media object in order to generate a value that indicates the likelihood that the input media object is associated with a class of media objects. Based on the likelihood value, the Classification Module 460 determines whether the input media object is associated with the class of media objects. For instance, the Classification Module 460 determines whether the input media object is associated with the class of media objects responsive to the value that indicates the likelihood that the input media object is associated with a class of media objects exceeding a threshold value (e.g. 80%, 90%). The Classification Module 460 may be used to detect any class of media content such as the genre of the media object and classes representing adult video content and therefore can be used in applications such as media content labeling and adult content detection. The Search Module 430 stores a result of the determination in memory 107 associated with the Search/Classification Module 140.

Figure 5:
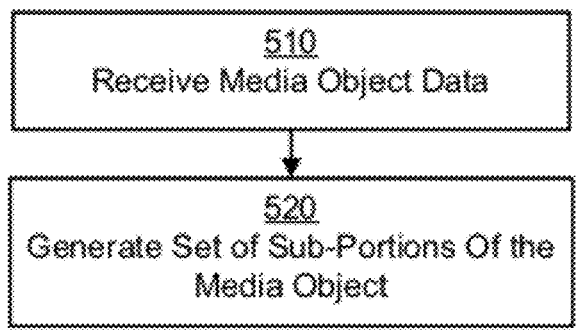
FIG. 5 illustrates steps performed by the Feature Generation Engine 130 to generate and stored a set of sub-portions associated with a media object according to one embodiment.

FIG. 5 illustrates steps performed by the Feature Generation Engine 130 to generate a set of sub-portions of a media object according to one embodiment. Other embodiments perform the illustrated steps in different orders, and/or perform different or additional steps. Moreover, some of the steps can be performed by modules other than the Feature Generation Engine 130.

The Feature Generation Engine 130 communicates with the Media Object Database 111 or the Media Object Corpus Database 121 to receive 510 media object. The Feature Generation Engine 130 generates 520 a set of sub-portions of the media object by sampling the media object at fixed intervals.

Figure 6:
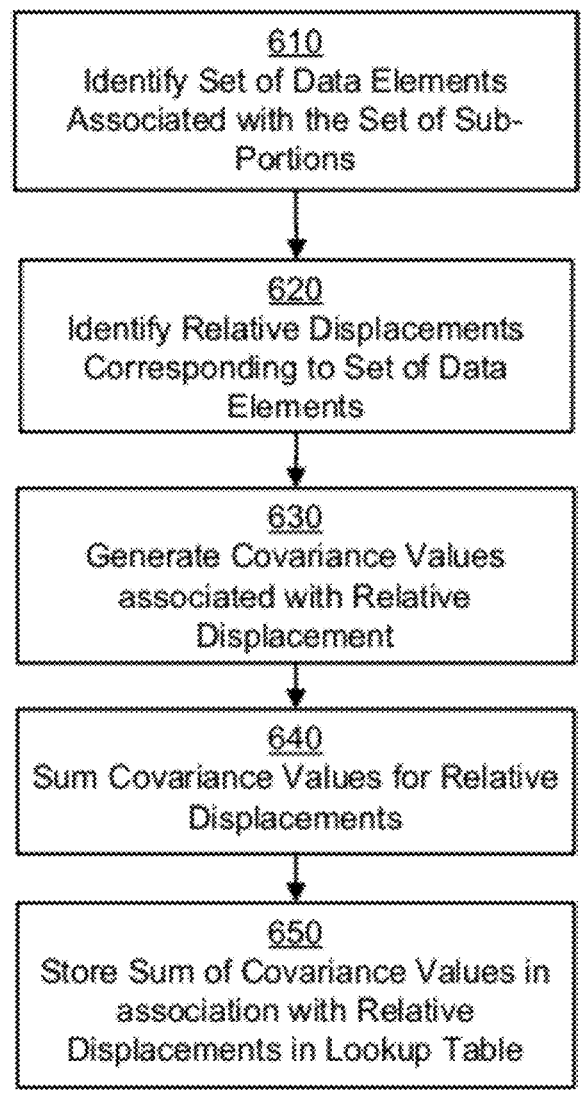
FIG. 6 illustrates steps performed by the Feature Generation Engine 130 to generate and store a lookup table according to one embodiment.

FIG. 6 illustrates steps performed by the Feature Generation Engine 130 to generate a lookup table according to one embodiment. Other embodiments perform the illustrated steps in different orders, and/or perform different or additional steps. Moreover, some of the steps can be performed by modules other than the Feature Generation Engine 130.

The Feature Generation Engine 130 identifies 610 the set of data elements that are associated with each sub-portion of data. The Feature Generation Engine 130 identifies 620 the set of relative displacements that correspond to each possible pair of data elements. For each relative displacement, the Feature Generation Engine 130 generates 630 covariance values for all pairs of data elements in the media object that have this relative displacement and sums 640 the covariance values. The Feature Generation Engine 130 stores 650 the sum of the covariance values for all pairs of data elements associated with a relative displacement in association with indicia which describes the relative displacement (e.g. coordinate data or interval data) in a lookup table.

Figure 7:
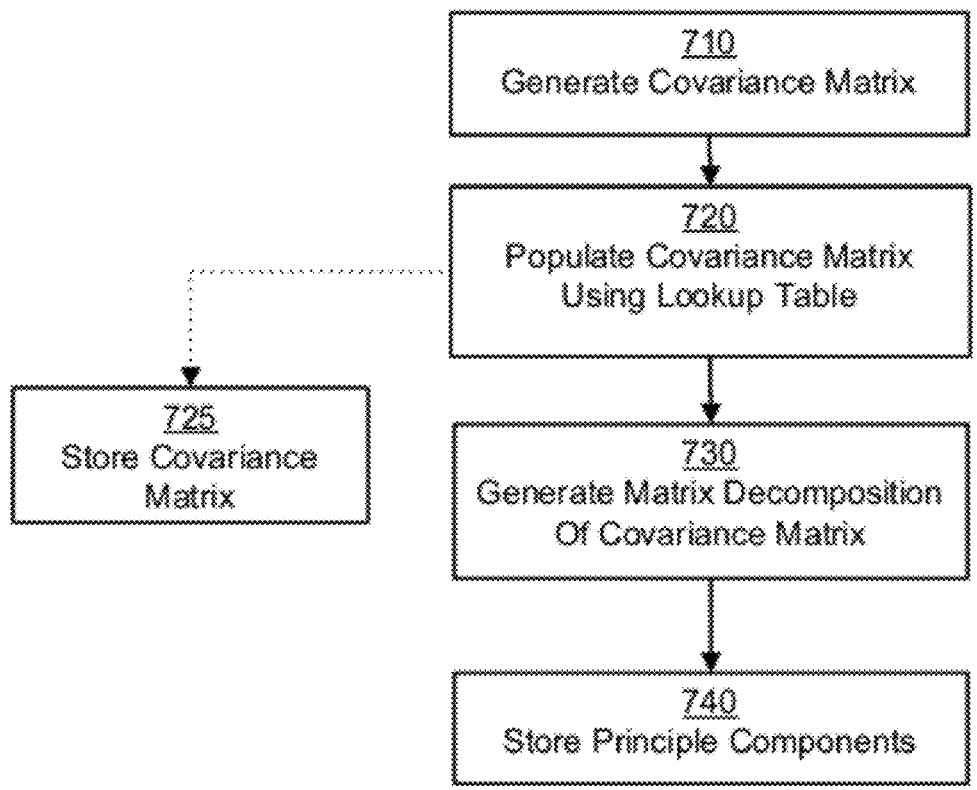
FIG. 7 illustrates steps performed by the Feature Generation Engine 130 to generate a feature set associated with a media object according to one embodiment.

FIG. 7 illustrates steps performed by the Feature Generation Engine 130 to generate a set of principal components according to one embodiment. Other embodiments perform the illustrated steps in different orders, and/or perform different or additional steps. Moreover, some of the steps can be performed by modules other than the Feature Generation Engine 130.

The Feature Generation Engine 130 generates 710 an empty covariance matrix, where the row and column in the covariance matrix corresponds to data elements associated with the sub-portions of the media object and each entry represents the outer product of a pair data elements over the different sub-portions in a reference media objects. The Feature Generation Engine 130 populates 720 the covariance matrix using the lookup table. For each entry in the covariance matrix, the Feature Generation Engine 130 determines a relative displacement associated with the pair of data elements, identifies a sum of covariance values associated with the relative displacement in the lookup table and populates 720 the entry of the covariance matrix with the sum of the features values. In some embodiments, the Feature Generation Engine 130 stores 725 the covariance matrix. The Feature Generation Engine 130 then generates 730 a matrix decomposition of the covariance matrix. The Feature Generation Engine 130 stores 750 the principal components generated in the matrix decomposition.

Figure 8:
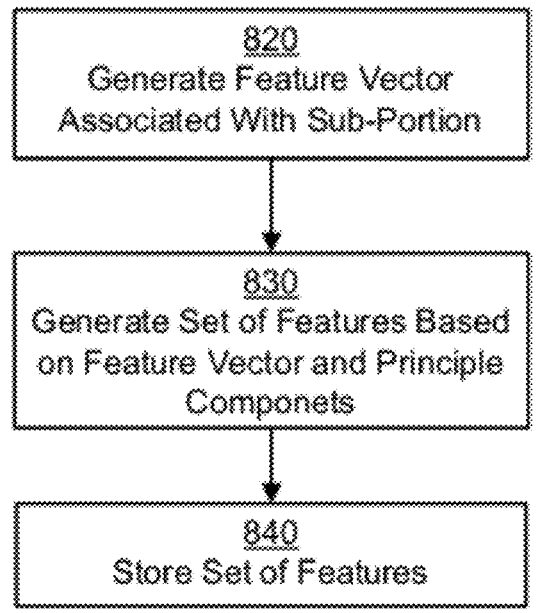
FIG. 8 illustrates steps performed by the Feature Generation Engine 130 to generate a set of features associated with a media object according to one embodiment.

FIG. 8 illustrates steps performed by the Feature Generation Engine 130 to generate a set of features associated with a media object according to one embodiment. Other embodiments perform the illustrated steps in different orders, and/or perform different or additional steps. Moreover, some of the steps can be performed by modules other than the Feature Generation Engine 130.

The Feature Generation Engine 130 generates 820 a feature vector for each sub-portion of a media object. The Feature Generation Engine 130 generates 830 a set of features for each sub-portion by taking the dot product between the feature vector and one or more lower-order principal components. The Feature Generation Engine 130 stores the set of features associated with the sub-portion of the media object.

Figure 9A:
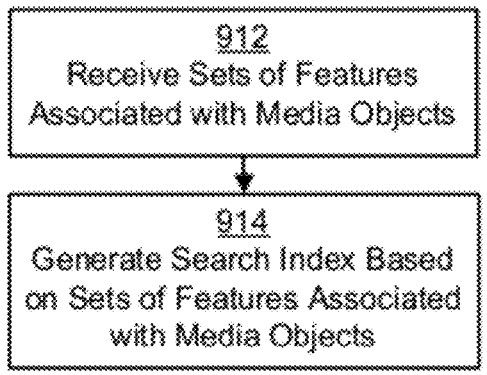
FIG. 9a illustrates steps performed by the Search/Classification Engine 140 to generate search indices according to one embodiment.

FIG. 9a illustrates steps performed by the Search/Classification Engine 140 to generate a Search Index 420 according to one embodiment. Other embodiments perform the illustrated steps in different orders, and/or perform different or additional steps. Moreover, some of the steps can be performed by modules other than the Search/Classification Engine 140.

The Search/Classification Engine 140 communicates with the Feature Generation Engine 130 to receive 912 sets of features associated with media objects. The Search/Classification Engine 140 generates 914 a Search Index 420 based on the sets of features associated with the media objects.

Figure 9B:
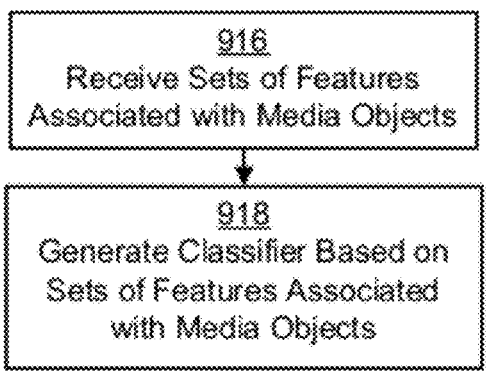
FIG. 9b illustrates steps performed by the Search/Classification Engine 140 to generate media object classifiers according to one embodiment.

FIG. 9b illustrates steps performed by the Search/Classification Engine 140 to generate a Media Object Classifier 450 according to one embodiment. Other embodiments perform the illustrated steps in different orders, and/or perform different or additional steps. Moreover, some of the steps can be performed by modules other than the Search/Classification Engine 140.

The Search/Classification Engine 140 communicates with the Feature Generation Engine 130 to receive 916 sets of features associated with media objects in association with classes associated with the media objects. The Search/Classification Engine 140 generates 918 a Media Object Classifier 450 based on sets of features associated with media objects and the classes associated with the media objects.

Figure 10:
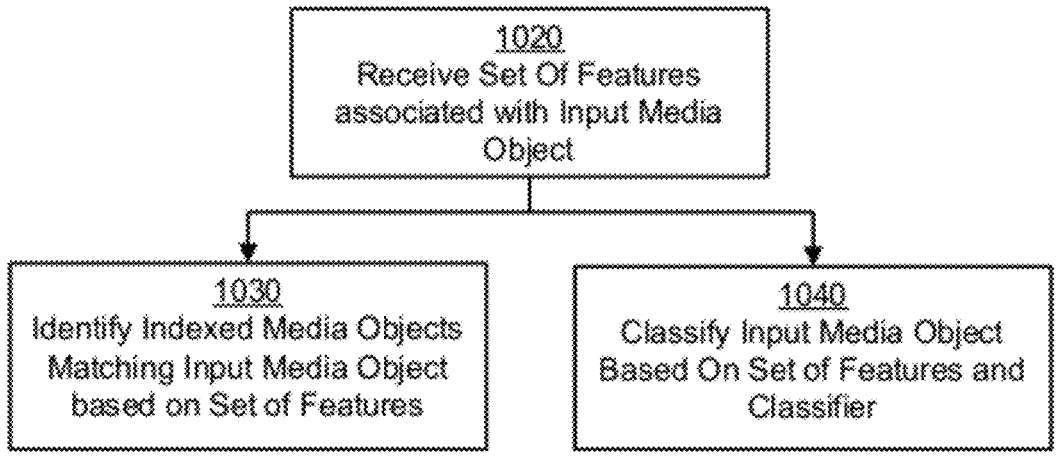
FIG. 10 illustrates steps performed by the Search/Classification Engine 140 to search and/or classify input media objects according to one embodiment.

FIG. 10 illustrates steps performed by the Search/Classification Engine 140 to identify matching media objects and classes associated with an input media object according to one embodiment. Other embodiments perform the illustrated steps in different orders, and/or perform different or additional steps. Moreover, some of the steps can be performed by modules other than the Search/Classification Module 140.

The Search/Classification Engine 140 communicates with the Feature Generation Engine 130 to receive 1020 sets of features associated an input media object. In one embodiment, the Search/Classification Engine 140 identifies 1030 a set of indexed media objects in the Search Index 420 that match the input media object by determining whether the set of features match the features associated with the media objects (or sub-portions thereof) in the Search Index 420. In another embodiment, the Search/Classification Engine 140 classifies 1040 the input media object by determining whether the input media object is associated with a class of media objects by applying a Media Object Classifier 450 to the set of features associated with the input media object.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing"

or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer-implemented method of generating a covariance matrix associated with a media object, wherein the covariance matrix describes the covariance between data elements in sub-portions of the media object, the method executed by a computing system, the computing system including a memory, and comprising:

automatically identifying a plurality of relative displacements within spatial/temporal data of the media object;
automatically generating a plurality of covariance sums, each of the covariance sums corresponding to one of the plurality of relative displacements;
storing the plurality of covariance sums in a lookup table in the memory, each of the covariance sums stored in the lookup table in association with the corresponding relative displacement;
populating a covariance matrix associated with the media object with covariance sums from the lookup table, wherein covariance sums from the lookup table in the memory are used to populate a plurality of entries in the covariance matrix; and
storing the covariance matrix in the memory of the computing system.

2. The method of claim 1, wherein automatically generating a plurality of covariance sums comprises:

identifying a plurality of pairs of data elements within spatial/temporal data of the media object, each pair of data elements having a relative displacement of the plurality of relative displacements;
generating, for each pair of data elements of the plurality of pairs of data elements, a covariance value based on data values associated with each pair of data elements;
identifying, for each of the plurality of relative displacements, a subset of the plurality of pairs of data elements that are associated with the relative displacement; and
generating a covariance sum for each of the plurality of relative displacements by calculating a sum of the covariance values associated with the subset of the plurality of pairs of data elements that are associated with the relative displacement.

3. The method of claim 1, wherein automatically generating a plurality of covariance sums comprises generating a fast Fourier transform based on the spatial/temporal data of the media object.

4. The method of claim 1, wherein automatically generating a plurality of covariance sums comprises:

identifying a plurality of pairs of data elements within the spatial/temporal data of the media object, each pair of data elements having a relative displacement of the plurality of relative displacements and a location of a plurality of locations;
generating, for each pair of data elements of the plurality of pairs of data elements, a covariance value based on data values associated with each pair of data elements;
identifying, for each of the plurality of relative displacements, a subset of the plurality of pairs of data elements that are associated with the relative displacement and a same location of the plurality of locations; and
generating a covariance sum for each of the plurality of relative displacements by calculating a sum of the covariance values associated with the subset of the plurality of pairs of data elements that are associated with the relative displacement and the same location of the plurality of locations.

5. The method of claim 1, wherein populating a covariance matrix associated with the media object comprises:

generating an empty covariance matrix, where each entry in the covariance matrix specifies a pair of data elements;
identifying, for each entry in the covariance matrix, a relative displacement between the pair of data elements;
identifying, for each entry in the covariance matrix, a covariance sum associated with the relative displacement in the lookup table; and storing, for each entry in the covariance matrix, the covariance sum associated with the relative displacement in the lookup table in the entry.

6. The method of claim 1, further comprising:
generating a matrix decomposition based on the covariance matrix;
identifying a set of lower-order components based on the matrix decomposition of the covariance matrix; and
storing the set of lower-order components.

7. The method of claim 6, further comprising:
generating a plurality of covariance matrices;
weighting each covariance matrix of the plurality of covariance matrices based on a number of pairs of data elements used to generate a covariance sum associated with an entry in the covariance matrix;
generating a combined covariance matrix based on an average of the weighted plurality of covariance matrices; and
generating a matrix decomposition based on the combined covariance matrix.

8. The method of claim 6, further comprising
generating a feature vector associated with a sub-portion of the media object; and
generating a set of features associated with the sub-portion of the media object based on the feature vector and the set of lower-order components.

9. The method of claim 8, further comprising:
generating a plurality of sets of features for a plurality of media objects; and
generating a search index based on the plurality of sets of features for the plurality of media objects.

10. The method of claim 9, further comprising:
identifying a set of media objects that match an input media object based on the search index.

11. The method of claim 8, further comprising:
generating a plurality of sets of features associated with a plurality of media objects in association with a plurality of classes associated with the plurality of media objects; and
generating a media object classifier based on the plurality of sets of features associated with the plurality of media objects in and the plurality of classes associated with the plurality of media objects.

12. The method of claim 11, further comprising:
generating a value which specifies the likelihood that an input media object is associated with a class of media objects responsive to applying the media object classifier to a set of features associated with the input media object.

13. The method of claim 1, wherein the data elements are pixels, the media object is a digital image and the relative displacement is a two-dimensional coordinate pair.

14. The method of claim 1, wherein the data elements are time points, the media object is an audio file and the relative displacement is a time interval.

15. The method of claim 1, wherein the data elements are three-dimensional coordinates, the media object comprises geographic data and the relative displacement is a vector.

16. A computer-implemented method of generating a covariance matrix associated with a media object, wherein the covariance matrix describes the covariance between data elements in sub-portions of the media object, the method executed by a computing system, the computing system including a memory, and comprising:
automatically identifying a plurality of relative displacements within spatial/temporal data of the media object;
automatically generating a plurality of covariance sums, each of the covariance sums corresponding to one of the plurality of relative displacements, and each of the covariance sums derived from a plurality of covariance values calculated from the spatial/temporal data of the media object;
storing the plurality of covariance sums in a lookup table in the memory, each of the covariance sums stored in the lookup table in association with the corresponding relative displacement;
populating a covariance matrix associated with the media object with covariance sums from the lookup table in the memory; and
storing the covariance matrix in the memory of the computing system.

17. The method of claim 16, wherein generating a plurality of covariance sums comprises:
identifying a plurality of pairs of data elements within spatial/temporal data of the media object, each pair of data elements having a relative displacement of the plurality of relative displacements;
generating, for each pair of data elements of the plurality of pairs of data elements, a covariance value based on data values associated with each pair of data elements;
identifying, for each of the plurality of relative displacements, a subset of the plurality of pairs of data elements that are associated with the relative displacement; and
generating a covariance sum for each of the plurality of relative displacements by calculating a sum of the covariance values associated with the subset of the plurality of pairs of data elements that are associated with the relative displacement.

18. The method of claim 16, wherein automatically generating a plurality of covariance sums comprises generating a fast Fourier transform based on the spatial/temporal data of the media object.

19. The method of claim 16, wherein automatically generating a plurality of covariance sums comprises:
identifying a plurality of pairs of data elements within the spatial/temporal data of the media object, each pair of data elements having a relative displacement of the plurality of relative displacements and a location of a plurality of locations;
generating, for each pair of data elements of the plurality of pairs of data elements, a covariance value based on data values associated with each pair of data elements;
identifying, for each of the plurality of relative displacements, a subset of the plurality of pairs of data elements that are associated with the relative displacement and a same location of the plurality of locations; and
generating a covariance sum for each of the plurality of relative displacements by calculating a sum of the covariance values associated with the subset of the plurality of pairs of data elements that are associated with the relative displacement and the same location of the plurality of locations.

20. The method of claim 16, wherein populating a covariance matrix associated with the media object comprises:
generating an empty covariance matrix, where each entry in the covariance matrix specifies a pair of data elements;
identifying, for each entry in the covariance matrix, a relative displacement between the pair of data elements;
identifying, for each entry in the covariance matrix, a covariance sum associated with the relative displacement in the lookup table; and
storing, for each entry in the covariance matrix, the covariance sum associated with the relative displacement in the lookup table in the entry.

21. The method of claim 16, further comprising:
generating a matrix decomposition based on the covariance matrix;
identifying a set of lower-order components based on the matrix decomposition of the covariance matrix; and
storing the set of lower-order components.

22. The method of claim 21, further comprising:
generating a plurality of covariance matrices;
weighting each covariance matrix of the plurality of covariance matrices based on a number of pairs of data elements used to generate a covariance sum associated with an entry in the covariance matrix;
generating a combined covariance matrix based on an average of the weighted plurality of covariance matrices; and
generating a matrix decomposition based on the combined covariance matrix.

23. The method of claim 21, further comprising
generating a feature vector associated with a sub-portion of the media object; and
generating a set of features associated with the sub-portion of the media object based on the feature vector and the set of lower-order components.

24. The method of claim 23, further comprising:
generating a plurality of sets of features for a plurality of media objects; and
generating a search index based on the plurality of sets of features for the plurality of media objects.

25. The method of claim 24, further comprising:
identifying a set of media objects that match an input media object based on the search index.

26. The method of claim 23, further comprising:
generating a plurality of sets of features associated with a plurality of media objects in association with a plurality of classes associated with the plurality of media objects; and
generating a media object classifier based on the plurality of sets of features associated with the plurality of media objects in and the plurality of classes associated with the plurality of media objects.

27. The method of claim 26, further comprising:
generating a value which specifies the likelihood that an input media object is associated with a class of media objects responsive to applying the media object classifier to a set of features associated with the input media object.

28. The method of claim 16, wherein the data elements are pixels, the media object is a digital image and the relative displacement is a two-dimensional coordinate pair.

29. The method of claim 16, wherein the data elements are time points, the media object is an audio file and the relative displacement is a time interval.

30. The method of claim 16, wherein the data elements are three-dimensional coordinates, the media object comprises geographic data and the relative displacement is a vector.

31. A computer-implemented method of generating a covariance matrix associated with a media object, wherein the covariance matrix describes the covariance between data elements in sub-portions of the media object, the method executed by a computing system, the computing system including a memory, and comprising:
automatically identifying a plurality of relative displacements within spatial/temporal data of the media object;
automatically identifying a plurality of pairs of data elements within spatial/temporal data of the media object, each pair of data elements having one of the plurality of relative displacements;
generating, for each pair of data elements of the plurality of pairs of data elements, a covariance value based on data values associated with each pair of data elements;
identifying, for each of the plurality of relative displacements, a subset of the plurality of pairs of data elements that are associated with the relative displacement; and
generating a covariance sum for each of the plurality of relative displacements by calculating a sum of the covariance values associated with the subset of the plurality of pairs of data elements that are associated with the relative displacement;
storing the plurality of covariance sums in a lookup table in the memory, each of the covariance sums stored in the lookup table in association with the corresponding relative displacement;
populating a covariance matrix associated with the media object with covariance sums from the lookup table; and
storing the covariance matrix in the memory of the computing system.

32. The method of claim 31, wherein populating a covariance matrix associated with the media object comprises:
generating an empty covariance matrix, where each entry in the covariance matrix specifies a pair of data elements;
identifying, for each entry in the covariance matrix, a relative displacement between the pair of data elements;
identifying, for each entry in the covariance matrix, a covariance sum associated with the relative displacement in the lookup table; and
storing, for each entry in the covariance matrix, the covariance sum associated with the relative displacement in the lookup table in the entry.

33. The method of claim 31, further comprising:
generating a matrix decomposition based on the covariance matrix;
identifying a set of lower-order components based on the matrix decomposition of the covariance matrix; and
storing the set of lower-order components.

34. The method of claim 33, further comprising:
generating a plurality of covariance matrices;
weighting each covariance matrix of the plurality of covariance matrices based on a number of pairs of data elements used to generate a covariance sum associated with an entry in the covariance matrix;
generating a combined covariance matrix based on an average of the weighted plurality of covariance matrices; and
generating a matrix decomposition based on the combined covariance matrix.

35. The method of claim 33, further comprising:
generating a feature vector associated with a sub-portion of the media object; and
generating a set of features associated with the sub-portion of the media object based on the feature vector and the set of lower-order components.

36. The method of claim 35, further comprising:
generating a plurality of sets of features for a plurality of media objects;
generating a search index based on the plurality of sets of features for the plurality of media objects; and
identifying a set of media objects that match an input media object based on the search index.

37. The method of claim 35, further comprising:
generating a plurality of sets of features associated with a plurality of media objects in association with a plurality of classes associated with the plurality of media objects;
generating a media object classifier based on the plurality of sets of features associated with the plurality of media objects in and the plurality of classes associated with the plurality of media objects; and generating a value which specifies the likelihood that an input media object is associated with a class of media objects responsive to applying the media object classifier to a set of features associated with the input media object.

38. The method of claim 31, wherein the data elements are pixels, the media object is a digital image, and the relative displacement is a two-dimensional coordinate pair.

39. The method of claim 31, wherein the data elements are time points, the media object is an audio file and the relative displacement is a time interval.

40. The method of claim 31, wherein the data elements are three-dimensional coordinates, the media object comprises geographic data and the relative displacement is a vector.

41. A computer-implemented method of generating a covariance matrix associated with a media object, wherein the covariance matrix describes the covariance between data elements in sub-portions of the media object, the method executed by a computing system, the computing system including a memory, and comprising:

automatically identifying a plurality of relative displacements within spatial/temporal data of the media object;

automatically generating a plurality of covariance sums by performing a fast Fourier transform based on the spatial/temporal data of the media object, each of the covariance sums corresponding to one of the plurality of relative displacements;

storing the plurality of covariance sums in a lookup table in the memory, each of the covariance sums stored in the lookup table in association with the corresponding relative displacement;

populating a covariance matrix associated with the media object with covariance sums from the lookup table; and storing the covariance matrix in the memory of the computing system.

42. The method of claim 41, wherein populating a covariance matrix associated with the media object comprises:

generating an empty covariance matrix, where each entry in the covariance matrix specifies a pair of data elements;

identifying, for each entry in the covariance matrix, a relative displacement between the pair of data elements;

identifying, for each entry in the covariance matrix, a covariance sum associated with the relative displacement in the lookup table; and storing, for each entry in the covariance matrix, the covariance sum associated with the relative displacement in the lookup table in the entry.

43. The method of claim 41, further comprising:
generating a matrix decomposition based on the covariance matrix;
identifying a set of lower-order components based on the matrix decomposition of the covariance matrix; and
storing the set of lower-order components.

44. The method of claim 43, further comprising:
generating a plurality of covariance matrices;
weighting each covariance matrix of the plurality of covariance matrices based on a number of pairs of data elements used to generate a covariance sum associated with an entry in the covariance matrix;
generating a combined covariance matrix based on an average of the weighted plurality of covariance matrices; and
generating a matrix decomposition based on the combined covariance matrix.

45. The method of claim 43, further comprising:
generating a feature vector associated with a sub-portion of the media object; and
generating a set of features associated with the sub-portion of the media object based on the feature vector and the set of lower-order components.

46. The method of claim 45, further comprising:
generating a plurality of sets of features for a plurality of media objects;
generating a search index based on the plurality of sets of features for the plurality of media objects; and
identifying a set of media objects that match an input media object based on the search index.

47. The method of claim 45, further comprising:
generating a plurality of sets of features associated with a plurality of media objects in association with a plurality of classes associated with the plurality of media objects;
generating a media object classifier based on the plurality of sets of features associated with the plurality of media objects in and the plurality of classes associated with the plurality of media objects; and
generating a value which specifies the likelihood that an input media object is associated with a class of media objects responsive to applying the media object classifier to a set of features associated with the input media object.

48. The method of claim 41, wherein the data elements are pixels, the media object is a digital image, and the relative displacement is a two-dimensional coordinate pair.

49. The method of claim 41, wherein the data elements are time points, the media object is an audio file and the relative displacement is a time interval.

50. The method of claim 41, wherein the data elements are three-dimensional coordinates, the media object comprises geographic data and the relative displacement is a vector.

* * * * *